Aug. 26, 1958 — J. R. HUBER — 2,848,777

CHAIN ANCHOR RELEASE MECHANISM

Filed Dec. 15, 1953

Inventor
J. Richard Huber
By Harris S. Campbell
Attorney

United States Patent Office 2,848,777
Patented Aug. 26, 1958

2,848,777

CHAIN ANCHOR RELEASE MECHANISM

John Richard Huber, Warrington, Pa., assignor to Eastern Rotorcraft Corporation, Doylestown, Bucks County, Pa., a corporation of Pennsylvania Application December 15, 1953, Serial No. 398,311

2 Claims. (Cl. 24—241)

This invention relates to chain securing and adjusting mechanism of the type used primarily in connection with the securing of cargo and the like.

The primary object of this invention is to provide simplified chain gripping mechanism which assures that the chain link cannot be engaged in an improper manner and which allows the link to be inserted in the gripping mechanism with a minimum of effort.

A further object of the invention is the provision of improved actuating mechanism including a handle located with respect to the frame structure to provide adequate protection against damage.

How the foregoing and other objects and advantages are attained will be clear from the following description in which—

Figure 1:
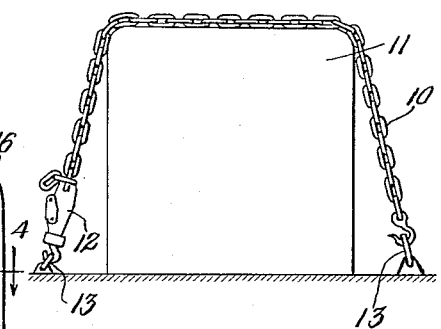
Figure 1 is a view illustrating how the apparatus may be used.

Referring to Figure 1, it will be seen that chain 10 is used to secure in position a heavy piece of cargo 11, the chain engaging unit 12 being used to grip the chain link and hold it in proper operating position. Chain 10 may be hooked into floor link 13 at one point and unit 12 also may be anchored to another fitting 13 at another point.

Figure 2:
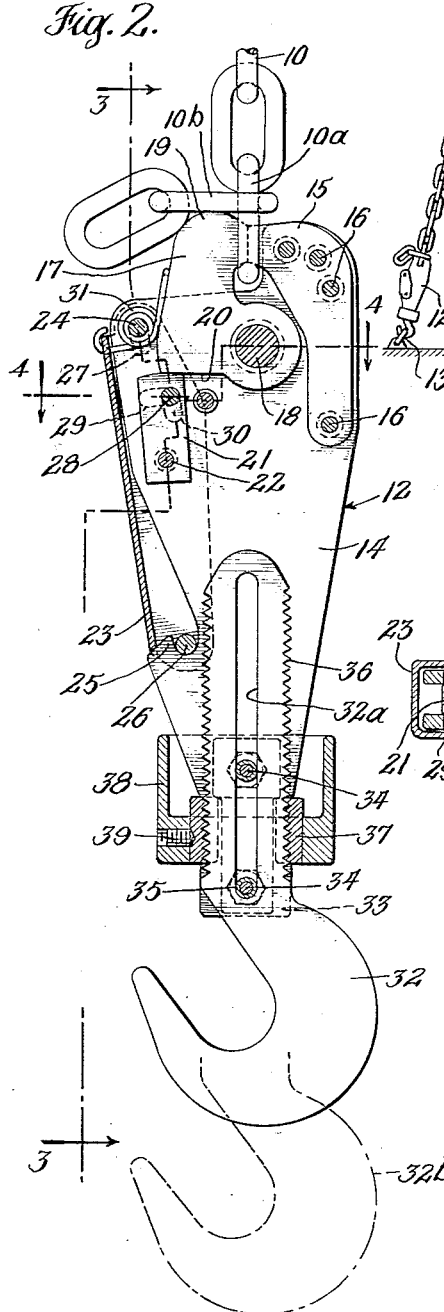
Figure 2 is a view taken in the direction of arrows 2—2, Figure 3, illustrating the mechanism of the chain engaging apparatus.
Figure 4:
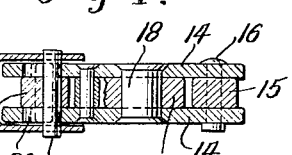
Figure 4 is a sectional view taken in direction of arrows 4—4, Figure 2.
Figure 3:
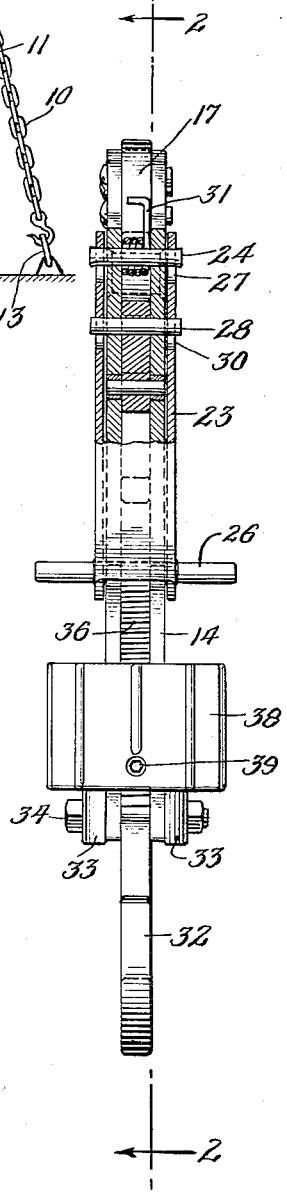
Figure 3 is an elevational view partly in section taken along line 3—3, Figure 2.

The details of construction of the chain securing and adjusting unit is illustrated clearly in Figures 2 to 4 inclusive. Chain 10 is attached to frame 14 by means of a suitable fixed jaw 15 which is anchored directly to the side members 14 by means of rivets 16 and by movable jaw 17 which is mounted by means of pivot 18 to side frame members 14. It will be noted that the center of pivot 18 lies close to line of action of chain pull. The upper part of jaw member 17 is shaped to fit into link 10a with sufficient space to allow the unloaded link 10b to extend as shown. A slight upward projection 19 extends beyond the edge of the jaw where it enters the chain link 10a thus forming a flat V shape between the edges of jaws 15 and 17.

The inner end of jaw 17 is formed with a flat surface 20 which normally engages a latch or cam member 21 which is pivoted to frame plates 14 by pivot 22. A handle 23 is formed of channel shaped section as illustrated clearly in Figure 4 and extends close to frame plates 14. Handle 23 is mounted on frame members 14 by means of pivot 24.

In order to retain the handle in normal position as shown, notch 25 is supplied in each of the frame plates 14 so as to engage rod 26 which projects transversely through handle 23 and provides for engagement for manual operation. In the end of handle 23 which is connected to pivot 24, a slot 27 permits endwise movement of handle 23 so that rod 26 may be removed from notches 25 to allow the handle to be swung to open position. As the handle is moved to open position, pivot pin 28, which is rigidly connected to latch member 21, causes the latch to be moved with the handle to a position where it is out of engagement with the flat surface 20 of jaw 17 and no longer will retain it in locked position. Pivot pin 28 extends through side plates 14 which are slotted as indicated at 29 to permit limited swinging motion of latch 21 to occur. The handle sides are also slotted in the direction shown at 30 in order to allow the handle to slide lengthwise with respect to pivot 28 of cam 21 while still engaging it to move it laterally and thereby disengage it from jaw 17. Spring member 31 which is supported on handle pivot 24 provides a force on jaw 17 to urge it to closed position. At the same time spring 31 engages the end of handle 23 and urges it to closed position where handle rods 26 are in engagement with notch 25.

Lenth adjustment of unit 12 is obtained by means of the mechanism shown at the lower end of the mechanism. This includes fork member 32 which is supported between side frames 14 by means of suitable thrust shoulder parts 33 which in turn are held in position on side frames 14 by means of bolts 34. Bushings 35 extend through slot 32a to act as spacers to retain plates 14 in properly spaced relationship and thus hold fork plate 32 in sliding relationship thereto. The edges of the fork plate are threaded as indicated at 36 and these threads engage in a cylindrical threaded collar 37, which is also supported in shoulder parts 33 in a fashion which permits rotation but prevents longitudinal movement of collar 37. Hand grip 38 is fastened to collar 37 by means of a suitable set screw 39. It will be observed that slot 32a acts as a position limiting means for anchor hook 32. This adjusting mechanism does not form a part of the present invention per se, being previously disclosed in my copending application U. S. Serial No. 153,618, filed April 3, 1950, now Patent No. 2,715,008 granted August 9, 1955.

To operate the present apparatus in actual practice one end of chain 10 is secured either to an anchor fitting as illustrated in Figure 1, or directly to the article to be secured. With hook 32 in extended position as indicated at 32b and with handle 23 in open position the chain is drawn taut by hand and the nearest convenient link 10a is inserted into place between jaws 15 and 17. This is readily accomplished by placing the end of link 10a against the slight projection 19 on the movable jaw 17 and applying a slight side pressure to open it. The link may then be slipped into position as shown in Figure 2. With the link in this position the handle is then snapped to closed position with rod 26 held by notches 25. This moves latch 21 into position against jaw locking surface 20, thereby securing the connection between unit 12 and chain 10. Hand wheel 38 is then rotated in order to shorten the overall length of the unit and remove any slack which may be in the chain and also to apply a slight initial tension to prevent any movement of the cargo during transit.

Release of the cargo is readily accomplished by merely gripping handle rod 26 and pulling generally upwardly and outwardly to release the handle from its locked position. This causes locking cam 21 to be moved from jaw surface 20. This releases the jaw 17 so that a slight tension applied to chain 10 moves jaw 17 against the pressure of spring 31 and disconnects the chain from the securing unit 12.

From the foregoing it will be clear that I have provided an improved construction for securing mechanism used in engaging and anchoring a loaded chain. With the improved unit, the chain link cannot engage the jaws improperly because the proportioning of the jaws prevents entrance into the link either in a transverse direction or with the loose end of the chain in wrong location. Further, the shape of the movable jaw provides for easy insertion of the engaging link into the jaws, the operator using one hand to hold the unit in position and the other hand to hold the chain. The construction in which the handle actuating mechanism lies closely adjacent the frame plates eliminates any fragile actuating mechanism projecting outside the contour of the unit where it might be subject to damage and subsequent faulty operation. With the construction shown the unit may be dropped or even run over by a vehicle without damaging the handle or operating parts.

I claim:

1. A securing device for attachment to a chain including a frame having a load transfer fitting at one end and chain engaging mechanism at the other, said chain engaging mechanism including a fixed jaw engageable with a chain link connected to said frame, a movable jaw engageable with a chain link having a pivot attachment to said frame, a load reaction surface on said movable jaw offset from the line of chain pull and being generally perpendicular to the direction of chain pull, a reaction member having a surface engageable with said load reaction surface, said reaction member having a pivot connecting it to said frame, a handle mounted along one edge of said frame, said handle having a pivotal attachment incorporating a slotted structure supporting the handle at one end adjacent the movable jaw, said handle having a longitudinal slot therein, a rod extending from said reaction member into said slot, said frame having a longitudinal slot therein adjacent the load transfer fitting end, said handle having a grip portion at the end opposite the pivotal attachment, said portion being shaped to engage the slot in said frame, and a spring urging said handle grip portion toward last named said slot.

2. A securing device for attachment to a chain including a frame having a load transfer fitting at one end and chain engaging mechanism at the other, said chain engaging mechanism including a member for engaging a chain link, said member having a pivot attaching it to said frame, said pivot being located close to the line of chain pull, said link engaging member having a reaction surface located in offset relationship to said attaching pivot, a reaction member having a surface engageable with said link engaging member reaction surface, said reaction member having a pivot connecting it to said frame at a point offset from the line of chain pull, a longitudinally disposed handle mounted along the edge of said frame for pivotal movement therewith, said handle incorporating a longitudinal slotted connection to said reaction member to allow limited longitudinal movement of said handle with respect to said frame, said frame having a longitudinally disposed slot at one edge near the load transfer fitting end, said frame slot being shaped to engage the end of said handle and a spring reacting against said handle to urge it longitudinally to engage said slot.

References Cited in the file of this patent

UNITED STATES PATENTS

| | | |
|---|---|---|
| 659,686 | Mitchell | Oct. 16, 1900 |
| 679,088 | Methven | July 23, 1901 |
| 715,655 | Getz et al. | Dec. 9, 1902 |
| 1,000,868 | Williams | Aug. 15, 1911 |
| 1,166,382 | Morse | Dec. 28, 1915 |
| 1,308,549 | McGowan | July 1, 1919 |
| 1,368,647 | Mayers | Feb. 15, 1921 |
| 2,327,751 | Unthank et al. | Aug. 24, 1943 |
| 2,370,406 | King | Feb. 27, 1945 |
| 2,595,450 | Coffing | May 6, 1952 |